2,970,528
HIGH SPEED STREAK SHUTTER

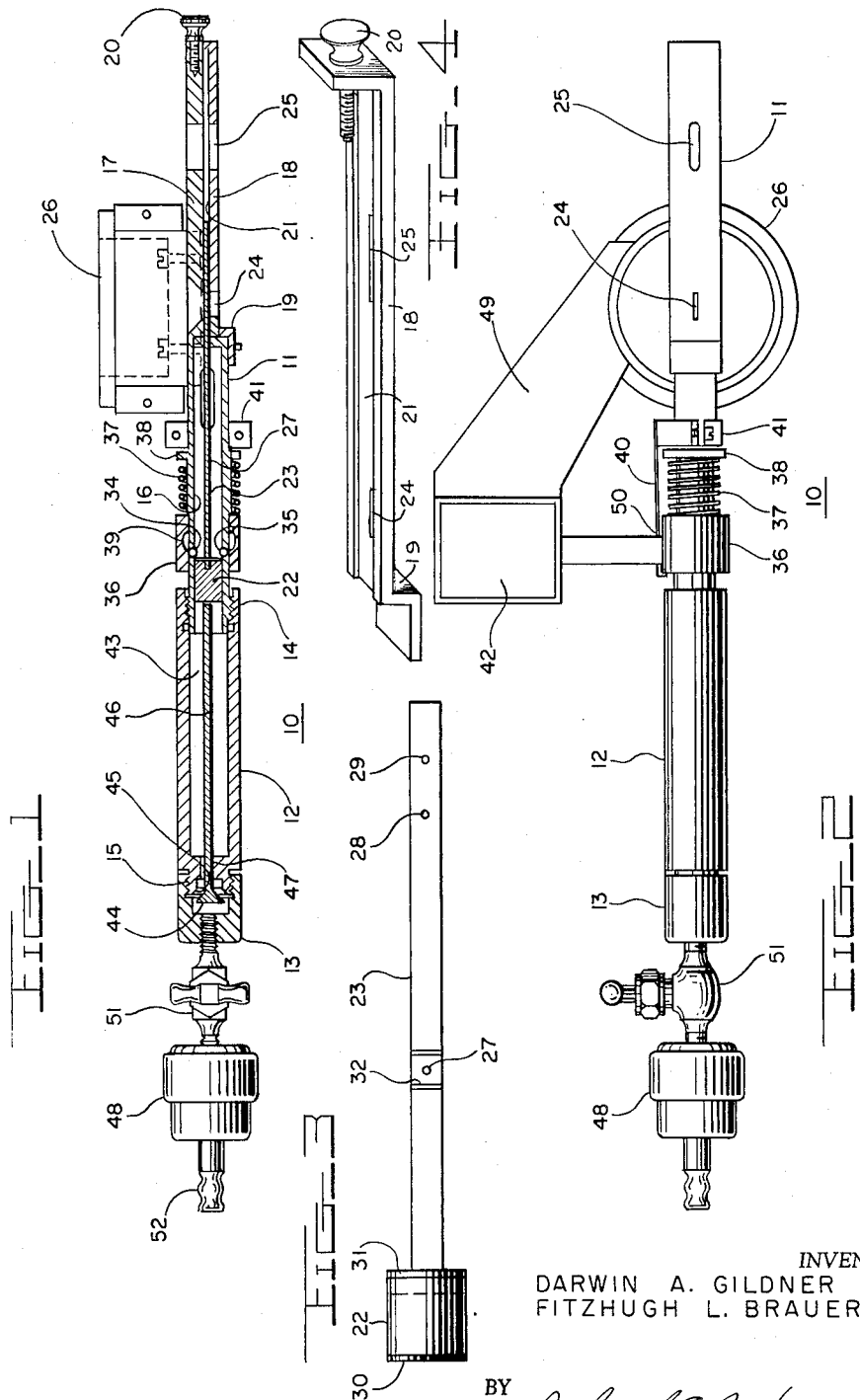
Feb. 7, 1961  D. A. GILDNER ET AL  2,970,528
HIGH SPEED STREAK SHUTTER
Filed Dec. 19, 1958
INVENTOR
DARWIN A. GILDNER
FITZHUGH L. BRAUER.
BY
Richard C. Reed
ATTORNEY

United States Patent Office 2,970,528
Patented Feb. 7, 1961

Darwin A. Gildner, District Heights, Md., and Fitzhugh L. Brauer, Alexandria, Va., assignors to the United States of America as represented by the Secretary of the Navy Filed Dec. 19, 1958, Ser. No. 781,814

4 Claims. (Cl. 95—54)

(Granted under Title 35, U.S. Code (1952), sec. 266)

The invention described herein may be manufactured and used by or for the Government of the United States of America for governmental purposes without the payment of any royalties thereon or therefor.

The present invention relates to high speed light shutters and more particularly to a linearly accelerated high speed shutter adapted to trigger an event and for taking a streak picture in a straight path.

In the art of high speed photography cameras have been developed which require an extremely rapid method of light shuttering. In the use of high speed cameras employing rotating mirrors, the light source must be eliminated precisely at the proper time to prevent double exposure of the film. In order to utilize the greater portion of the short exposure time involved in such photography, it is necessary that the light shutter effect complete closure in a minimum of time after the operation has begun. In photography of a fast moving object, it is necessary that the shutter move along with the object in order to photograph sufficient details of the object.

The present invention is particularly adapted for photographing or obtaining the spectra of a moving gas, etc., in a straight path across an aperture. Size and weight limitations makes the use of high speed shutters impracticable, and bulkiness of construction, timing, vacuum sealing, traverse path and overall versatility makes the use of a rotating disc impractical. The shutter of the present invention solves the problems cited for the prior art devices.

The present invention makes use of a shutter in the form of a piston having a shutter blade connected thereto and actuated by a fluid pressure. The blade has a pin hole therein which moves past a slot in the housing through any predetermined distance. The hole passing by the slot constitutes the shutter opening and the length of the slot permits photographing over a desired length. The blade is adapted to trigger an event to be photographed and also has additional holes therein which passes a light source therethrough to operate a photo-cell properly coupled to a scope. Photographing the phenomena appearing on the scope will indicate the shutter speed.

It is therefore an object of the present invention to provide a high speed shutter, particularly adapted for taking a streak picture across an elongated aperture.

Another object is to provide a fluid operated shutter which is simple in operation, and yet provides an efficient shutter for taking a photograph of high velocity objects.

Still another object is to provide a high speed shutter which is adapted for triggering an event to be photographed.

Other objects of the present invention will be apparent to those skilled in the art from consideration of the following specification relating to the annexed drawing in which:

Fig. 1 is a partial cross-sectional view of the device illustrating the relative parts;

Fig. 2 is a side view of the device shown in operating position ready to be operated;

Fig. 3 illustrates a detailed view of the piston and blade connected thereto; and Fig. 4 illustrates the removable shutter, blade guide cap.

In accordance to the present invention the device is directed to a shutter mechanism developed to take high speed spectra in conjunction with a vacuum spectrograph or for use with any other suitable means for recording an event. The device includes a housing within which a piston is assembled for high speed movement under a fluid pressure. The piston has a blade connected thereto which has a hole therethrough positioned relative to one side of an axially disposed elongated aperture or slot in the housing which operates as the shutter opening and two holes therein relative to the opposite side of the aperture which holes are effective to operate a photo-cell which is properly connected with a scope. As the piston is driven along the piston guide the shutter hole moves past the axially disposed elongated aperture to allow light to pass therethrough to the film as a shutter in a camera, of course after the hole in the piston blade passes the aperture, no light passes to a spectrograph, film or any suitable means for recording the desired information.

Now referring to the drawing wherein like reference characters represent like parts throughout, there is shown by illustration a high speed shutter device in accordance with the present invention. The device includes a housing 10 which comprises essentially three sections 11, 12 and 13 having matching screw threads on an end thereof adapted to be screwed together respectively at 14 and 15. The housing section 11 includes a cylindrical portion which includes piston cylinder 16 and a somewhat flat rectangular end portion 17 which has an axially disposed rectangular groove therein which is coupled with a like cap portion 18 secured thereto by a bracket 19 and a bolt 20 to form a shutter blade guide 21 as shown by Fig. 4. The piston cylinder is adapted to receive a shutter blade 23 which is secured to the forward end of the piston 22 to be moved therewith.

Axially aligned elongated apertures or slots 24 and 25 are made through the end portion such that the apertures pass through the piston blade guide 21. Aperture 24 is aligned with a mounting adapter 26 which is secured to the end extension 17 by suitable bolts and upon which any suitable recording means can be secured in order to record an event that takes place opposite to aperture 24. Aperture 25 is for the purpose of permitting passage of light therethrough which is blocked by the piston blade in order to trigger an event and/or to operate any suitable equipment by means of an oppositely disposed photo-cell not shown for simplification of the drawing. The apertures are positioned relative to each other and holes are made in the shutter blade relative thereto such that the forward end of the shutter blade passes aperture 25 at approximately the time a hole 27 in the shutter blade begins to pass aperture 24. Two additional holes 28 and 29 are made in the shutter blade near the forward end for example, one and two cm. respectively from the end to permit light to pass therethrough to actuate a circuit to a scope through use of a photo-cell.

Piston 22 is formed of an expendable material such as balsa wood and has a rubber sheet 30 of 0.005 inch thickness cemented to the back end and an aluminum ring 31 of 0.031 inch thickness cemented to the forward end. A hole in the shutter blade is covered with a sheet of 0.002 inch thick aluminum foil 32 which is cemented in place and has a 0.004 inch pin hole 27 therethrough to form the shutter opening. Holes 28 and 29 have diameters of 0.015 in. spaced respectively for illustrative purposes one and two centimeters away from the forward end of the shutter blade.

The piston is positioned in housing section 11 and restrained against forward motion, under pressure on the rear end, by a piston cocking and release mechanism. The cocking and release mechanism includes steel balls 34 which are positioned in suitable holes 35 near the rear end of the piston cylinder in housing 11 such that a portion of the ball will fit into the piston cylinder but not slip entirely through the hole into the cylinder. A slip ring 36 fits over the cylindrical end of the housing and has a circular groove 39 in the inner surface thereof. The depth of the groove and diameter of the ball is such that when the slip ring fits over the ball, at a position along the slip ring other than at the groove, a portion of the ball will be forced into the piston cylinder in front of the piston, and when the groove in the slip ring is over the steel balls the balls will be forced into the grooves by pressure on the back of the piston and the piston will be permitted to pass by the balls. In loading the mechanism, the ring is forced against a compression spring 37 which is restrained by an abutment rib 38 on the housing and then the slip ring is held in place by a trigger spring 40 which is secured at the opposite end to the housing 11 by a split ring 41 or any other suitable means. For the purposes of remotely releasing the trigger spring, a solenoid 42 is secured to bracket 49 adjacent to the trigger spring and connected to the trigger spring at 50 in order to actuate the trigger spring when electrically excited and thus release the slip ring which is forced rearward by the compressed spring. When the slip ring is forced rearward, the balls are forced into the groove 39 by the pressure on the back of the piston and the piston is forced forward.

The housing 11 has one end of housing 12 connected thereto which provides a pressure chamber 43 behind the piston. The pressure chamber has therein a valve 44 which seats against valve seat 45 to stop the flow of the fluid pressure into the chamber after the piston has been fired. The valve stem 46 is sufficiently long to pass through valve guide 47 and contact the piston head and to be held open when the piston is in a loaded position. In order to assemble the valve into position housing 13 is removable from housing 12 to expose the area and permit assembly of the valve seat and valve.

The device is also provided with a quick disconnect valve 48 and a hand operated control valve 51 for controlling the fluid pressure flow into the pressure chamber through connection end 52 when in operation.

In operation of the device, sections 12 and 13 remain secured together with valve 44 assembled in place. Housing sections 11 and 12 are separated and piston 22 with the shutter blade 23 secured thereto is positioned in the piston cylinder and the rearward end of the shutter blade guide. The slip ring 36 is forced forward against the compression spring 37 and locked in a cocked position by trigger spring 40. Forcing the slip ring forward in the cocked position presses the balls partially into the cylinder chamber ahead of the piston to restrain the piston against forward motion. The housing sections 11 and 12 are secured together which in turn forces valve 44 into an open position through contact of the piston head with the end of the valve stem 46. The device is now ready for admitting the fluid pressure into the pressure chamber behind the piston.

The end 52 is connected with a fluid pressure source and valve 51 is opened to permit flow of the fluid into the pressure chamber until the desired pressure is obtained in the pressure chamber. The solenoid is energized by any suitable electrical circuitry, not shown, for simplification of the drawings which raises the trigger spring that releases the slip ring. The slip ring is forced rearward by the compression spring and when in its uncocked position, the circular groove on the inner surface of the slip ring is positioned directly over the balls. The pressure behind the piston forces the balls into the circular groove in the slip ring sufficiently for the piston to pass and to be forced forward along the piston cylinder by the pressure behind the piston.

When the forward end of the piston passes slot 25, it blocks out passage of light through the slot and is adapted to trigger an event. At approximately the same instant, pin hole 27 reaches the beginning of slot 24 at the rearward end, and as the pin hole passes by slot 24 light is permitted to pass through the hole from the event to be recorded to the device doing the recording, such as a spectrograph or film. The piston is driven at a velocity approximately the speed of the event, thus the event is recorded throughout the length of the slot. The piston is also provided with pin holes 28 and 29 wherein these holes pass slot 25 to operate a properly adapted photocell which when properly coupled to a scope will present a picture thereof suitable for determining the speed of the piston.

It is seen that a piston shutter as described above can be used to take high speed events wherein the hole in the piston is adapted to move across the slot 24 at the same rate of speed as the event. It has been determined that an air pressure of from 200 to 350 lbs. behind the piston will produce piston speeds of from 300 to 460 ft. per second.

For the purposes of providing a simple device, the pistons are made of balsa wood and therefore dispensable, thus, there is no need to provide a special piston energy absorption device in the cylinder. Since the pistons are dispensable, housing sections 11 and 12 and the shutter blade guide cap 18 must be separated to remove the piston remains from the device before a new piston can be inserted for a different recording. Since the piston is made of balsa wood, the piston fractures or breaks easily without damage to the piston cylinder or the shutter blade guide.

It is to be understood that more holes could be made in the shutter blade and that the shutter blade can be made of a length that it would pass slot 25 to trigger an event a substantial time before hole 27 reaches the slot 24 to permit taking of the picture.

Obviously many modifications and variations of the present invention are possible in the light of the above teachings. It is therefore to be understood that within the scope of the appended claims the invention may be practiced otherwise than as specifically described.

What is claimed is:

1. A high speed light shutter device which comprises a housing, said housing including a pressure chamber, a piston cylinder, and a shutter blade guide all in axial alignment therein, at least one axially disposed elongated aperture extending through said housing along said shutter blade guide perpendicular to the axis of said housing to provide a light path therethrough, said piston cylinder and said shutter blade guide being constructed to respectively receive a piston and a shutter blade integrally secured to said piston, said shutter blade having at least one aperture therein and movable along said guide by pressure on said piston, valve means positioned within said pressure chamber operative to admit fluid into said pressure chamber and controllable by said piston to close said pressure chamber against admittance of fluid pressure into said chamber when said piston is in an unloaded position and to admit fluid pressure into said chamber when said piston is in a loaded position and a loading means for holding said piston in a loaded position.

2. A high speed light shutter device as claimed in claim 1 which includes an adapter secured to said housing for securing a recording device in alignment with said elongated aperture in said housing.

3. A high speed light shutter and event triggering device which comprises a housing, said housing including a pressure chamber, a piston cylinder and a shutter blade guide all axially disposed in said housing, at least two axially disposed elongated slots extending through said shutter blade guide portion perpendicular to the axis of said housing, a piston adapted for axial motion within said piston cylinder, a shutter blade connected at the rearward end to said piston with the opposite end adapted to extend forward through said piston cylinder into said shutter blade guide, at least one aperture in said shutter blade, a valve means for admitting a fluid pressure into said pressure chamber, said valve having a stem extending axially through said pressure chamber and operative to engage the rearward end of said piston, a locking means for locking said piston in a loaded position in the rearward end of said piston cylinder whereby said piston holds said valve in an open position, a second valve for admitting fluid pressure into said pressure chamber, and means adapted to operate said locking means to release said piston for forward axial motion in said piston cylinder whereby the forward end of said shutter blade closes at least one of said elongated apertures to trigger an event and said aperture in said shutter blade passes one other of said elongated apertures to permit recording of said event.

4. A high speed light shutter and event triggering device which comprises a housing, said housing including a pressure chamber, a piston cylinder and a shutter blade guide all axially disposed in said housing, first and second axially disposed elongated slots extending through said shutter blade guide portion perpendicular to the axis of said housing, a piston adapted for axial motion within said piston cylinder, a shutter blade connected at the rearward end to said piston with the opposite end adapted to extend forward through said piston cylinder into said shutter blade guide, at least one aperture in said shutter blade, said shutter blade adapted to be positioned with said aperture rearward of said first elongated aperture in said housing and with the forward end thereof rearward of said second elongated aperture in said housing, a valve means for admitting a fluid pressure into said pressure chamber, said valve having a stem extending axially through said pressure chamber and operative to engage the rearward end of said piston, a locking means secured to said housing and positioned to lock said piston in a loaded position in the rearward end of said piston cylinder whereby said piston contacts said valve and forces said valve into an open position, a second valve for admitting fluid pressure into said pressure chamber, and means to operate said locking means to release said piston for forward axial motion in said piston cylinder whereby the forward end of said shutter blade closes said second elongated aperture in said housing to trigger an event and said aperture in said shutter blade passes by said first elongated aperture in said housing to permit recording of said event.

References Cited in the file of this patent

UNITED STATES PATENTS 451,027   Connon ---------------- Apr. 28, 1891